United States Patent
Li et al.

(10) Patent No.: US 7,697,959 B2
(45) Date of Patent: Apr. 13, 2010

(54) ADAPTIVE MULTIPLE-ANTENNA SYSTEMS WITH OMNI-DIRECTIONAL AND SECTOR-DIRECTIONAL ANTENNA MODES

(75) Inventors: Guoqing Li, Hillsboro, OR (US); Minyoung Park, Portland, OR (US); Liuyang Lily Yang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 742 days.

(21) Appl. No.: 11/545,380

(22) Filed: Oct. 10, 2006

(65) Prior Publication Data

US 2008/0085738 A1   Apr. 10, 2008

(51) Int. Cl.
*H04M 1/00* (2006.01)

(52) U.S. Cl. .................. 455/562.1; 455/101; 455/575.7; 455/63.3; 370/310; 370/338; 370/329; 370/208; 375/267; 375/346; 375/148

(58) Field of Classification Search .............. 455/562.1, 455/101, 63.3, 575.7; 375/267, 346, 148; 370/310, 338, 329, 208
See application file for complete search history.

(56) References Cited

U.S. PATENT DOCUMENTS

| | | | |
|---|---|---|---|
| 6,850,741 B2 | 2/2005 | Lei et al. | |
| 6,965,762 B2 * | 11/2005 | Sugar et al. | 455/276.1 |
| 7,099,678 B2 * | 8/2006 | Vaidyanathan | 455/500 |
| 7,206,606 B2 * | 4/2007 | Kobayashi et al. | 455/562.1 |
| 7,324,602 B2 * | 1/2008 | Magee et al. | 375/267 |
| 7,333,421 B2 * | 2/2008 | Li | 370/208 |
| 7,342,970 B2 * | 3/2008 | Liu | 375/259 |
| 7,483,675 B2 * | 1/2009 | Kent et al. | 455/67.11 |
| 7,483,719 B2 * | 1/2009 | Kim et al. | 455/562.1 |
| 7,515,655 B2 * | 4/2009 | Uchida et al. | 375/316 |
| 7,515,939 B2 * | 4/2009 | Catreux-Erceg et al. | 455/562.1 |
| 7,522,562 B2 * | 4/2009 | Kent et al. | 370/334 |
| 7,545,778 B2 * | 6/2009 | Sugar et al. | 370/335 |
| 2005/0095996 A1 | 5/2005 | Takano | |
| 2005/0249151 A1 | 11/2005 | Takano | |
| 2007/0232235 A1 | 10/2007 | Li et al. | |
| 2007/0297365 A1 | 12/2007 | Li et al. | |

OTHER PUBLICATIONS

"International Search report and Written Opinion Received", PCT/US2007/080741, (Feb. 4, 2008),1-10 pgs.

* cited by examiner

*Primary Examiner*—Marceau Milord
(74) *Attorney, Agent, or Firm*—Trop, Pruner & Hu, P.C.

(57) ABSTRACT

In a communication device compatible with either a SISO or MIMO access point, a set of antennas is configured as either sector-directional or omni-directional, depending upon whether the communication channel is characterized by the communication device as either strongly line of sight, or strongly scattering, respectively. In some embodiments, for the case in which a MIMO access point is utilized, the singular values of an estimated channel matrix are generated, and based upon the singular values, the characteristics of the communication channel is estimated. Other embodiments are described and claimed.

27 Claims, 4 Drawing Sheets

ADAPTIVE MULTIPLE-ANTENNA SYSTEMS WITH OMNI-DIRECTIONAL AND SECTOR-DIRECTIONAL ANTENNA MODES

FIELD

Embodiments relate to digital communication systems, and more particularly, to multiple-antenna communication systems.

BACKGROUND

Multi-path wireless channels are capable of large channel capacities, and may be properly exploited through the use of an MIMO (Multiple-Input-Multiple-Output) communication system. An MIMO system employs multiple transmit antennas and multiple receive antennas. Standard IEEE 802.16e, sometimes referred to as Mobile Worldwide Interoperability for Microwave Access (Mobile WiMAX), supports MIMO antenna technology. Future wireless networks will also support MIMO antenna technology. There have been efforts to introduce a unified proposal for the next generation of high performance wireless networks, developed under the guidelines of the IEEE Standards Association and submitted to the IEEE 802.11n Task Group N (TGn). One of the goals is to enable MIMO Spatial Division Multiplexing to provide reliable transmission speeds of up to 315 megabits per second (Mbps) with two antennas, and up to 630 Mbps with larger systems employing more than two antennas.

Access point density in an enterprise WLAN (Wireless Local Area Network) is expected to increase to where the typical distance between an access point and a client may at times be 10 feet or less. As a result, the effect of line-of-sight (LOS) communication is expected to become important. A strong LOS communication link increases spatial signal correlation, so as to diminish the benefit of an MIMO system.

Accordingly, it is useful to provide communication technology in a multiple antenna client that may be configured to perform well when a LOS communication path is dominant. Furthermore, because upgrading an access point to a MIMO system is more expensive than for a client, it is expected that there will be a period of time for which access points have not yet been upgraded from a SISO (Single-Input-Single-Output) system to a MIMO system. Consequently, it is also useful to provide communication technology in which a multiple antenna client is easily configured whether the access point is a SISO system or an MIMO system.

DESCRIPTION OF EMBODIMENTS

In the descriptions that follow, the scope of the term "some embodiments" is not to be so limited as to mean more than one embodiment, but rather, the scope may include one embodiment, more than one embodiment, or perhaps all embodiments.

Embodiments configure multiple antennas as either omni-directional or sector-directional, depending upon whether a communication channel is characterized as having a strong LOS component or a strong scattering component. When characterized as a LOS communication channel, the multiple antennas are configured as sector-directional. In some embodiments, when configured as sector-directional, each antenna effectively has an antenna pattern beamwidth covering $2\pi/m$ radians in azimuth, where m is the number of antennas.

Embodiments may find utility in a client (e.g., notebook computer) or in an access point, where the channel matrix may be an uplink channel matrix (from the client to the access point), or a down link channel matrix (from the access point to the client). A communication channel may be defined in various ways. Before describing an embodiment, it is useful to first consider one possible definition of a communication channel for an MIMO system, and its corresponding channel matrix.

Figure 1:
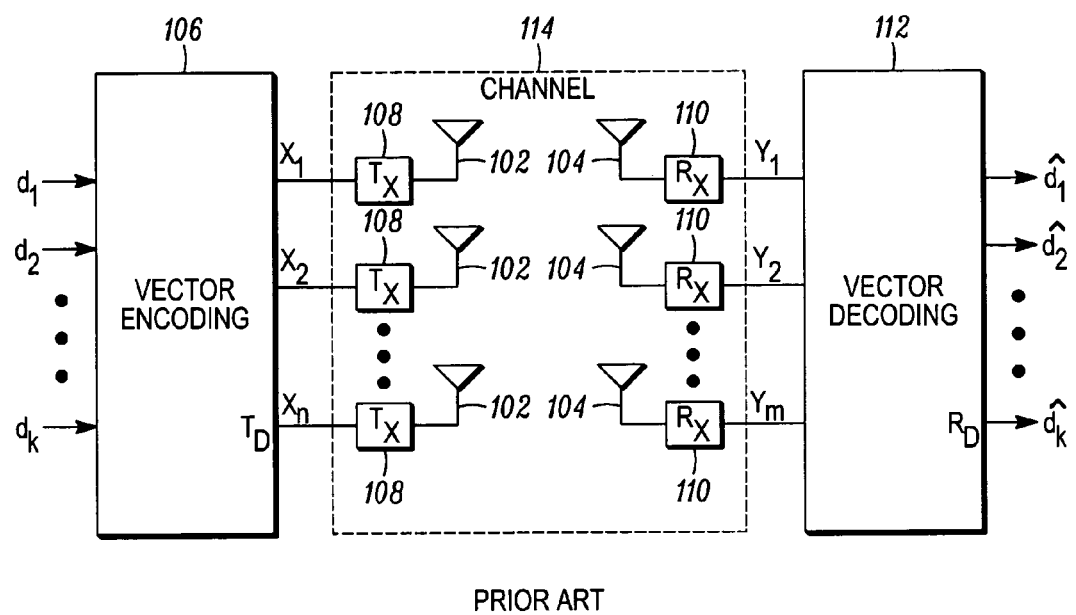
FIG. 1 illustrates a prior art communication system.

FIG. 1 is a high-level system diagram of a portion of a MIMO system utilizing n transmit antennas 102 and m receive antennas 104. The symbols $d_i$, $i=1, \ldots, k$ represent k complex-valued data quantities to be transmitted. These data quantities may arise by de-multiplexing one or more data stream into k data streams, in which coding may have been applied.

Vector Encoding functional unit 106 encodes $d_i, i=1, \ldots, k$ into the n complex-valued quantities $x_i$, $i=1, \ldots, n$. Defining $\bar{d}_D$ as a k-dimensional column vector having components $[\bar{d}_D]_i = d_i, i=1, \ldots, k$, and defining $\bar{x}_D$ as an n-dimensional column vector having components $[\bar{x}_D]_i = x_i, i=1, \ldots, n$, one may write the vector encoding as $$\bar{x}_D = T_D \bar{d}_D,$$

where $T_D$ denotes a complex-valued n by k matrix. (The significance of the subscript D will be discussed later.)

The complex-valued quantities $x_i, i=1, \ldots, n$ represent the in-phase and quadrature components of a baseband signal, such as a voltage signal, to be transmitted over a channel. Functional units 108 (e.g., transmitters) indicate modulators for up-converting a baseband signal to an RF (radio-frequency) signal before transmission by antennas 102, although the scope of the embodiment is not limited in this regard.

Receivers 110 down-convert the received signals provided by antennas 104 into the m complex-valued baseband signals $y_i, i=1, \ldots, m$. Vector Decoding functional unit 112 indicates that the m complex-valued baseband signals $y_i, i=1, \ldots, m$ are decoded into the k complex-valued baseband signals $\hat{d}_i, i=1, \ldots, k$. Defining $$\bar{\hat{d}}_D$$

as a k-dimensional column vector having components $$[\bar{\hat{d}}_D]_i = \hat{d}_i, i=1, \ldots, k,$$

and defining $\bar{y}_D$ as an m-dimensional column vector having components $[\bar{y}_D]_i = y_i, i=1, \ldots, m$, one may write the vector decoding as $$\bar{\hat{d}}_D = R_D \bar{y}_D,$$

where $R_D$ denotes a complex-valued k by m matrix. It is desirable that the quantities $\hat{d}_i, i=1, \ldots, k$ are in some sense a "good" estimate of $d_i, i=1, \ldots, k$.

There are various ways to define a communication channel. In FIG. 1, a communication channel may be defined to include the components within dashed box 114. For this model of a communication channel, the channel inputs are $x_i, i=1, \ldots, n$ and the channel outputs are $y_i, i=1, \ldots, m$. If Vector Encoding 106 and transmitters 108 are associated with an access point, and Vector Decoding 112 and receivers 110 are associated with a client, then the channel defined by box 114 may be referred to as the downlink channel. If on the other hand, Vector Encoding 106 and transmitters 108 are associated with a client, and Vector Decoding 112 and receivers 110 are associated with an access point, then the channel defined by box 114 may be referred to as the uplink channel. Although FIG. 1 shows only a one-way channel, in practice there is a downlink channel in addition to an uplink channel. For convenience, the channel in FIG. 1 will be referred to as a downlink channel. This is the reason for using the subscript D in the above discussion.

Although the above example is described with respect to a client and an access point, the methods and apparatuses described herein may be readily applicable to other communication devices, such as subscriber stations and base stations, for example.

Figure 2A:
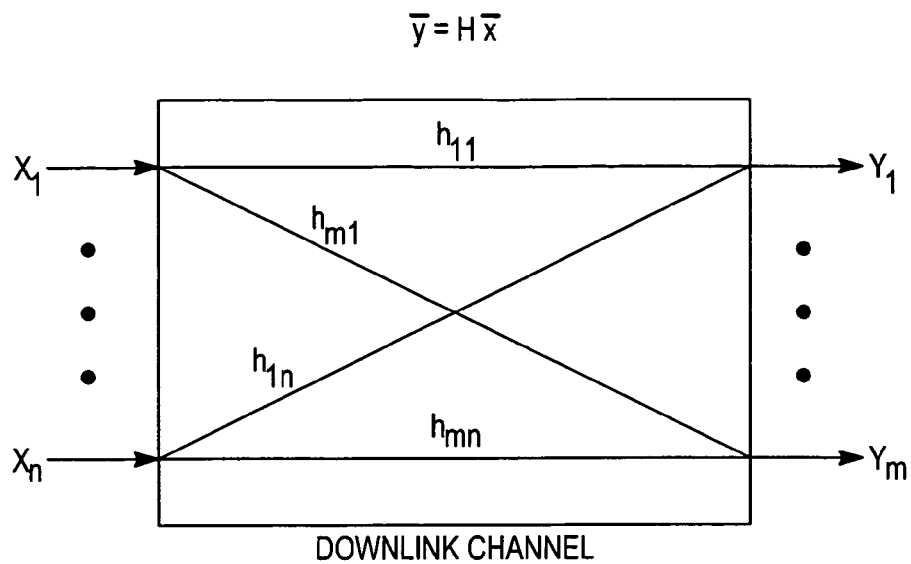
FIG. 2 illustrates a prior art communication channel.

The downlink channel defined by box 114 may be abstracted as shown in FIG. 2A. For simplicity, the downlink channel depicted in FIG. 2A is a stationary, noiseless channel. However, in practice, there will be noise sources, and the channel transfer function may be fading.

In FIG. 2A, $h_{ij}, i=1, \ldots, m; j=1, \ldots, n$ are complex-valued scalars representing the channel gains due to the gains of the transmit antennas, receive antennas, transmitters, and receivers. It is convenient to define $h_{ij}$ as $$h_{ij} = (Tx_j)(TG_{ji})w_{ji}(RG_{ji})(Ry_i),$$

where $Tx_j$ is the gain of the transmitter for symbol $x_j$; $TG_{ji}$ is the antenna gain for the transmit antenna associated with $x_j$ in the direction toward the receive antenna associated with symbol $y_i$; $RG_{ji}$ is the antenna gain for the receive antenna associated with symbol $y_i$ for a signal received from the direction of the antenna associated with symbol $x_j$; $Ry_i$ is the gain for the receiver for the symbol $y_j$; and $w_{ji}$ is the response of the physical transmission medium between transmit antenna j and receive antenna i.

Defining the m by n downlink channel matrix H to have components $[H]_{ij} = h_{ij}, i=1, \ldots, m; j=1, \ldots, n$, the input-output relationship defined by the downlink channel matrix H is $$\bar{y}_D = H\bar{x}_D.$$

Figure 2B:
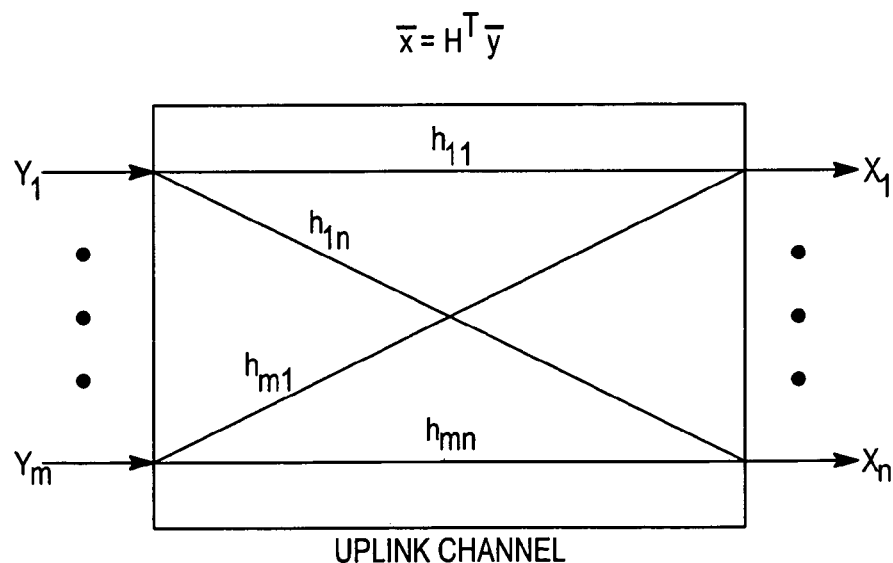

In general, the uplink channel matrix, where $y_i, i=1, \ldots, m$ are now being transmitted and $x_i, i=1, \ldots, n$ are received, is different from H. This is so because for the uplink channel, receivers are used to generate the $x_i, i=1, \ldots, n$ instead of transmitters 108, and transmitters are used to generate the $y_i, i=1, \ldots, m$ instead of receivers 110, and as a result, the overall channel gains may be different. However, if one assumes that the channel is calibrated to take into account the differences in transmitter and receiver gains for uplink and downlink communication, then the same channel gains $h_{ij}$, $i=1, \ldots, m; j=1, \ldots, n$ as indicated in FIG. 2A also hold for the uplink channel of FIG. 2B. With this assumption, the two-way channel is said to be reciprocal, and the input-output relationship for the uplink channel is given by $$\bar{x}_U = H^T \bar{y}_U,$$

where $^T$ denotes transposition, and the subscript U denotes uplink communication.

Embodiments may find application in an access point as well as in a client. Without loss of generality, subscripts distinguishing a downlink quantity from an uplink quantity may be dropped. Accordingly, in describing the embodiments, for convenience the downlink communication channel matrix is considered, so that the input-output channel matrix transformation is written simply as $\bar{y} = H\bar{x}$, and adaptive antenna configuration is performed on the client side. It should be appreciated that the embodiments are not necessarily limited to a client, but may find utility on both sides of a communication channel.

Figure 3:
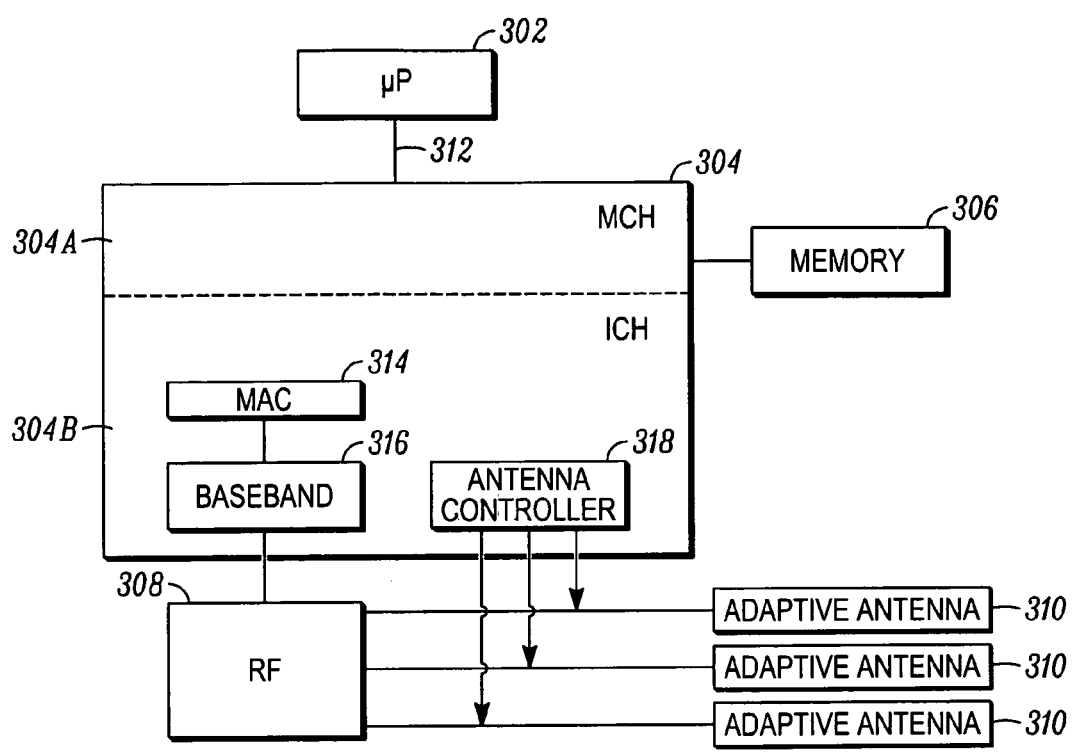
FIG. 3 illustrates a computer system according to an embodiment of the present invention.

An application of an embodiment to a computer system is illustrated in FIG. 3. FIG. 3. illustrates, in simplified form, a portion of a computer system, comprising microprocessor 302, chipset 304, system memory 306, RF (Radio Frequency) module 308, and adaptive antennas 310. In the particular embodiment of FIG. 3, chipset 304 includes MCH (Memory Controller Hub) 304A and ICH (Input/Output Controller Hub) 304B. Microprocessor 302 communicates with chipset 304 via front-side bus 312. MCH 304A serves as a controller for system memory 306. Integrated in ICH 304B is MAC (Media Access Control) layer 314, baseband module 316, and antenna controller 318. The protocol layers higher than MAC layer 314 are not explicitly shown.

In the particular embodiment of FIG. 3, RF module 308 is part of the PHY (Physical) layer in the communication protocol stack. RF module 308 down-converts the RF signals received by adaptive antennas 310 to baseband signals, which are provided to baseband module 316. Antenna controller 318 processes the baseband signals, and configures adaptive antennas 310 as either omni-directional or sector-directional, depending upon how the communication channel is characterized.

For some computer systems, MAC layer 314 and baseband module 316 may reside off chipset 304. Chipset 304 may itself comprise one or more discrete integrated chips, or some or all of its functional units may be integrated on microprocessor 302. System memory 306 may comprise a hierarchical structured memory, where some portions may be integrated on microprocessor 302.

For some embodiments, antenna controller 318, or portions thereof, may be implemented as an ASIC (Application Specific Integrated Circuit) integrated within chipset 304, on a discrete chip off chipset 304, or as a software module running on microprocessor 302. The processing performed by antenna controller 318 is described in reference to FIG. 4.

Figure 4:
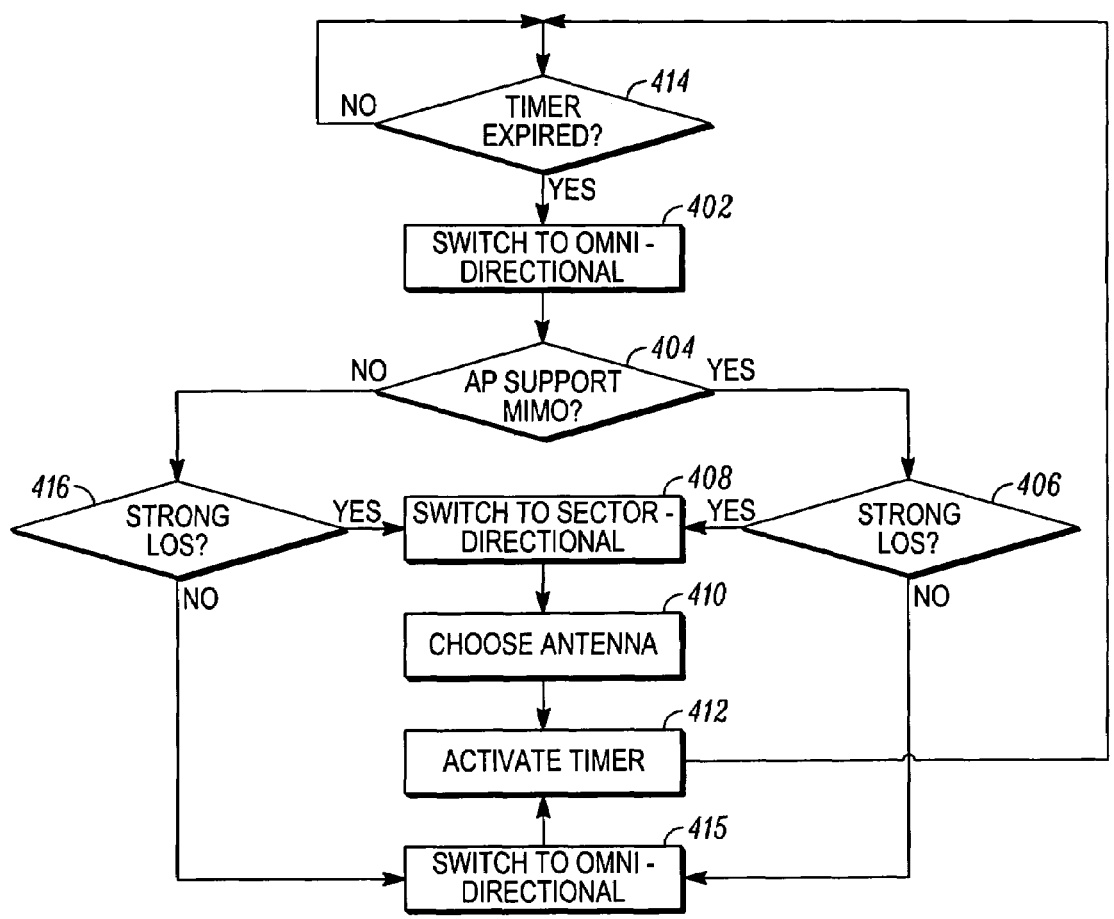
FIG. 4 is a flow diagram illustrating the processing of an antenna controller according to an embodiment of the present invention.

FIG. 4 is a flow diagram illustrating the processing performed by antenna controller 318 according to an embodiment. A timer is used, so that each time the timer expires, control is brought to block 402 in which each antenna is switched to its omni-directional mode. Block 404 directs which branch in the flow diagram is taken, depending upon whether the access point supports MIMO. This information is transmitted by the access point, so that it is available to the client. If MIMO is supported, then control is brought to block 406 in which the channel is characterized as either a strongly scattering channel or strongly LOS channel. In some embodiments, this characterization of the channel is determined by analyzing the channel matrix H.

The channel matrix H may be analyzed in several ways. For some embodiments, the rank of H is determined. A low rank channel matrix indicates a communication channel with weak scattering. Accordingly, for some embodiments, the communication channel is characterized as having a strong scattering component if $$\text{rank}\{H\} > N,$$

where N is a positive integer threshold.

It should be noted that in practice, the channel matrix H is not known a priori, but is estimated. Accordingly, the symbol H is to be understood as representing either the actual channel matrix, or an estimate of the channel matrix, and it should be clear from context which representation applies. Various methods may be used to estimate the channel matrix. For example, the columns of the channel matrix H may easily be observed by transmitting a $\bar{x}$ such that only one component of $\bar{x}$ is non-zero. For example, if the first component of $\bar{x}$ is 1 and all the other components are zero, then (in the noiseless case) $\bar{y}$ is the first column of H. To estimate H in the presence of noise, more than one measurement may be taken, followed by a sample-data average of the measurements.

It also should be noted that if H where known a priori, in practice it will generally be full rank even if there is no scattering. Accordingly, it is to be understood that the expression rank$\{H\}$ may be interpreted to represent the number of singular values of H that are greater than some threshold $\epsilon$. That is, the m by n matrix H may be decomposed as $$H = \sum_{i=1}^{\min\{m,n\}} \sigma_i u_i v_i^H,$$

where $\sigma_1 \geq \sigma_2 \geq \ldots \sigma_{\min\{m,n\}} \geq 0$ are the singular values of H, $u_i$ is the $i^{th}$ column of an m by m unitary matrix U, and $v_i$ is the $i^{th}$ column of an n by n unitary matrix V. In the expression for the singular value decomposition, the superscript H denotes complex conjugate transposition, a mnemonic for Hermitian, and should not be confused with the channel matrix. The rank of H may be defined as the maximum index j for which $\sigma_j > \epsilon$, where $\epsilon$ is some suitably chosen small number, which may be found by simulation or experiment to provide acceptable performance.

In some other embodiments, the communication channel may be characterized by observing the distribution of singular values. For example, the communication channel may be characterized as strongly LOS if $$\frac{\sigma_1}{\sum_{j \neq 1} \sigma_j} > \lambda,$$

where $\lambda$ is some threshold. (We have assumed that the singular values are ordered so that $\sigma_1$ is the maximum of the singular values.)

Other methods for observing the distribution of singular values may be implemented. Generally stated, a communication channel may be characterized as strongly LOS if most of the energy of H is concentrated among a relatively small number of singular values. That is, if $$\sum_{i=1}^{N} \sigma_i u_i v_i^H$$

is close to H, where $N \ll \min\{m, n\}$, then the channel may be characterized as strongly LOS.

If in block 406 it is determined that the channel is strongly LOS, then control is brought to block 408 in which the antennas are configured to be sector-directional. In block 410, one of the sector-directional antennas is chosen to be used for communication to the access point, and in block 412 the timer is re-set and activated, whereby control is brought to block 414.

If, however, block 406 determines that the communication channel is not strongly LOS, then control is brought to block 415, whereby antennas 310 are configured to be omni-directional. In this way, the advantages of the MIMO system are exploited. Control is then brought to block 412.

If block 404 determines that the access point does not support MIMO, e.g., a SISO transmitter, then control is brought from block 404 to block 416. Block 416 characterizes the channel as either strongly LOS or strongly scattering. However, in general block 416 will employ a different algorithm than block 406. This is so because H in this case is an m by 1 vector, which is rank 1.

For some embodiments, the channel is characterized by observing the cross-correlation of channel gains from one antenna to another. For example, the sample data averages of the products $h_i h_j$ for $i \neq j$, denoted as $E\{h_i h_j\}$, are formed, where because H in this case is an m by 1 vector, $h_i$ is the $i^{th}$ component of H. $E\{\ \}$ denotes an ensemble average, but in practice, the ensemble average of a random variable is estimated by forming the average of a large number of samples of the random variable, i.e., a sample average. Accordingly, $E\{\ \}$ will also be used to denote a sample average. For some embodiments, the communication channel is characterized as strongly LOS if $$\sum_{i \neq j} |E\{h_i h_j\}| > \Lambda,$$

where $\Lambda$ is some threshold.

If the communication channel is characterized as strongly LOS, then control is brought to block 408. If, however, block 416 determines that the communication channel is scattering, then control is brought to block 415.

Various methods may be employed by block 410 to choose one of the multiple antennas for communication with the access point. As one simple example, a beacon may be received from the access point, and the signal strength is sampled at each antenna. The antenna providing the largest signal power is chosen.

By choosing a single sector-directional antenna when the benefits of MIMO are diminished due to a strongly LOS channel, it is expected that interference to or from adjacent clients will be reduced, thus increasing spatial re-use, or channel re-usability in the same contention space, and thereby contributing to a higher channel capacity. Whereas for those cases in which MIMO provides a benefit, such as a communication channel characterized as strongly scattering, the antennas are configured as omni-directional so as to take advantage of the MIMO system.

Adaptive antennas 310 may be designed by standard antenna design principles. Each adaptive antenna 310 may comprise an array of simple antenna elements, such as dipoles. An array may be a phased-array, so that it may be configured to be omni-directional or sector-directional, depending upon the phase shifts applied to the individual array elements and the way in which their outputs are summed. The phase shifting and summing may be performed in the RF domain, or baseband domain, or in the digital domain after the baseband signals are quantized and represented as digital numbers.

Various modifications may be made to the disclosed embodiments without departing from the scope of the invention as claimed below.

Various mathematical relationships may be used to describe relationships among one or more quantities. For example, a mathematical relationship or mathematical transformation may express a relationship by which a quantity is derived from one or more other quantities by way of various mathematical operations, such as addition, subtraction, multiplication, division, etc. Or, a mathematical relationship may indicate that a quantity is larger, smaller, or equal to another quantity. These relationships and transformations are in practice not satisfied exactly, and should therefore be interpreted as "designed for" relationships and transformations. One of ordinary skill in the art may design various working embodiments to satisfy various mathematical relationships or transformations, but these relationships or transformations can only be met within the tolerances of the technology available to the practitioner.

Accordingly, in the following claims, it is to be understood that claimed mathematical relationships or transformations can in practice only be met within the tolerances or precision of the technology available to the practitioner, and that the scope of the claimed subject matter includes those embodiments that substantially satisfy the mathematical relationships or transformations so claimed.

What is claimed is:

1. An apparatus comprising:
   a set of antennas, each antenna having an omni-directional mode and a sector-directional mode; and
   a controller to switch each antenna in the set of antennas to its sector-directional mode based upon estimating a communication channel as having a first characteristic, and to switch each antenna in the set of antennas to its omni-directional mode based upon estimating the communication channel as having a second characteristic, wherein the communication channel has the first characteristic if dominated by a line-of-sight communication path, and has the second characteristic otherwise.

2. The apparatus as set forth in claim 1, the controller to utilize for communication, for a time interval, only one antenna in the set of antennas after each antenna in the set of antennas has been switched to its sector-directional mode.

3. The apparatus as set forth in claim 1, the controller to estimate a communication channel matrix having more than one row and more than one column if a signal from a multiple-input-multiple-output communication device is received, and to estimate the communication channel as having the first or second characteristic based upon a set of singular values of the communication channel matrix.

4. The apparatus as set forth in claim 3, the controller to estimate the communication channel as having the second characteristic if the number of singular values greater than a threshold is greater than an integer threshold, and to estimate the communication as having the first characteristic otherwise.

5. The apparatus as set forth in claim 3, the controller to estimate the communication channel as having the first characteristic if a quotient is greater than a threshold, the quotient having a dividend equal to the maximum of the singular values and having a divisor equal to the sum of the singular values, where the sum excludes a singular value having the maximum, and the controller to estimate the communication channel as having the second characteristic otherwise.

6. The apparatus as set forth in claim 3, the controller to estimate cross-correlations of channel gains among the set of antennas if a received beacon signal indicates that multiple-input-multiple-output is not supported.

7. The apparatus as set forth in claim 6, the controller to estimate the communication channel as having the first characteristic if a sum of the estimated cross-correlations is greater than a threshold.

8. The apparatus as set forth in claim 1, the controller to estimate cross-correlations of channel gains among the set of antennas if a received beacon signal indicates that multiple-input-multiple-output is not supported.

9. The apparatus as set forth in claim 8, the controller to estimate the communication channel as having the first characteristic if a sum of the estimated cross-correlations is greater than a threshold.

10. An article of manufacture comprising a computer readable medium storing instructions thereon, which, when executed on a computer, cause the computer to, if a received signal indicates a multiple-input-multiple-output transmitter:
    estimate a channel matrix H of dimension m by n, where m>1 and n>1,
    perform a singular value decomposition of H to generate singular values of H; and
    configure a set of antennas as a set of omni-directional antennas or sector-directional antennas, depending upon the singular values.

11. The article of manufacture as set forth in claim 10, wherein the set of antennas is configured as a set of sector-directional antennas if the number of singular values greater than a threshold is greater than an integer threshold, and the set of antennas is configured as a set of omni-directional antennas otherwise.

12. The article of manufacture as set forth in claim 10, wherein the set of antennas is configured as a set of sector-directional antennas if a quotient is greater than a threshold, the quotient having a dividend equal to the maximum of the singular values and having a divisor equal to the sum of the singular values, where the sum excludes a singular value having the maximum, and the set of antennas is configured as a set of omni-directional antennas otherwise.

13. The article of manufacture as set forth in claim 10, wherein if the received signal indicates a transmitter that is not a multiple-input-multiple-output transmitter, the instructions cause the computer to estimate cross-correlations of channel gains.

14. A method for a first device to communicate with a second device, the method comprising:
    determining at the second device whether the first device comprises a multiple-input-multiple-output transmitter;
    estimating at the second device the channel matrix to provide an estimated matrix H of dimension m by n, where m>1, and n>1 if the second device determines that the first device comprises a multiple-input-multiple-output transmitter, and n=1 otherwise; and
    if n>1, performing a singular value decomposition of H so that $$H = \sum_{i=1}^{min\{m,n\}} \sigma_i u_i v_i^T,$$

where $\sigma_1 \geq \sigma_2 \geq \ldots \sigma_{min\{m,n\}} \geq 0$ are the singular values of H, $u_i$ is the $i^{th}$ column of a m by m unitary matrix U, and $v_i^T$ is the $i^{th}$ row of a n by n unitary matrix V; and configuring each antenna in a set of antennas as either omni-directional or sector-directional, depending upon the singular values.

15. The method as set forth in claim 14, further comprising:
determining the maximum index K for which $\sigma_K > \epsilon$, where $\epsilon$ is a positive number; and
configuring each antenna in the set of antennas as sector-directional if the maximum index K is such that K<N, where N is an integer.

16. The method as set forth in claim 14, further comprising:
forming the quotient $$\frac{\sigma_1}{\sum_{j \neq 1} \sigma_j};$$

and
configuring each antenna in the set of antennas as sector-directional if the quotient is greater than a threshold.

17. The method as set forth in claim 14, further comprising:
if n=1, calculating $E\{h_i h_j\}$ for some i, where j ranges over the set of integers 1 through m, excluding i, where $h_k$ for k=1, 2, ..., m is the $k^{th}$ component of H, and E denotes a sample-data average; and
configuring each antenna in the set of antennas as omni-directional or sector-directional depending upon the $E\{h_i h_j\}$.

18. The method as set forth in claim 17, further comprising:
configuring each antenna in the set of antennas as sector-directional if $$\sum_{j \neq 1} |E\{h_i h_j\}| > \Lambda$$

where $\Lambda$ is a threshold.

19. A system comprising:
a set of antennas, each antenna having an omni-directional mode and a sector-directional mode;
a processor;
system memory in communication with the processor;
a chipset in communication with the processor and the system memory; and
a controller to switch each antenna in the set of antennas to its sector-directional mode based upon estimating a communication channel as having a first characteristic, and to switch each antenna in the set of antennas to its omni-directional mode based upon estimating the communication channel as having a second characteristic, the controller to estimate a communication channel matrix having more than one row and more than one column if a signal from a multiple-input-multiple-output communication device is received, and to estimate the communication channel as having the first or second characteristic based upon a set of singular values of the communication channel matrix.

20. The system as set forth in claim 19, wherein the controller is integrated with the chipset.

21. The system as set forth in claim 19, wherein the controller is implemented as a process running on the processor.

22. The system as set forth in claim 19, the controller to estimate the communication channel as having the second characteristic if the number of singular values greater than a threshold is greater than an integer threshold, and to estimate the communication as having the first characteristic otherwise.

23. The system as set forth in claim 19, the controller to estimate the communication channel as having the first characteristic if a quotient is greater than a threshold, the quotient having a dividend equal to the maximum of the singular values and having a divisor equal to the sum of the singular values, where the sum excludes a singular value having the maximum, and the controller to estimate the communication channel as having the second characteristic otherwise.

24. The system as set forth in claim 19, the controller to estimate cross-correlations of channel gains among the set of antennas if a received beacon signal indicates that multiple-input-multiple-output is not supported.

25. The system as set forth in claim 24, the controller to estimate the communication channel as having the first characteristic if a sum of the estimated cross-correlations is greater than a threshold.

26. The system as set forth in claim 19, the controller to estimate cross-correlations of channel gains among the set of antennas if a received beacon signal indicates that multiple-input-multiple-output is not supported.

27. The system as set forth in claim 26, the controller to estimate the communication channel as having the first characteristic if a sum of the estimated cross-correlations is greater than a threshold.

* * * * *